US008477004B2

(12) United States Patent
Bugiel et al.

(10) Patent No.: US 8,477,004 B2
(45) Date of Patent: Jul. 2, 2013

(54) MAGNET POLE FOR MAGNETIC LEVITATION VEHICLES, AND METHOD FOR THE PRODUCTION THEREOF

(75) Inventors: Peter Bugiel, Fuldabrueck (DE); Andreas Diekmann, Munich (DE); Joachim Kraemer, Zierenberg (DE); Daniel Tschada, Fuldabrueck (DE); Qinghua Zheng, Taufkirchen (DE)

(73) Assignee: Thyssenkrupp Transrapid GmbH, Kassel (DE)

( * ) Notice: Subject to any disclaimer, the term of this patent is extended or adjusted under 35 U.S.C. 154(b) by 0 days.

(21) Appl. No.: 13/387,797

(22) PCT Filed: Jul. 29, 2010

(86) PCT No.: PCT/EP2010/004636
§ 371 (c)(1),
(2), (4) Date: Jan. 30, 2012

(87) PCT Pub. No.: WO2011/023276
PCT Pub. Date: Mar. 3, 2011

(65) Prior Publication Data
US 2012/0126921 A1    May 24, 2012

(30) Foreign Application Priority Data
Aug. 28, 2009   (DE) .................. 10 2009 038 559

(51) Int. Cl.
*H01F 7/00* (2006.01)
*H01F 41/00* (2006.01)
(52) U.S. Cl.
USPC ........................ 335/297; 335/296; 104/281

(58) Field of Classification Search
USPC ............ 335/296–299, 301–306; 104/281–286
See application file for complete search history.

(56) References Cited

U.S. PATENT DOCUMENTS

| 3,042,841 | A | * | 7/1962 | Bryan ........................... 335/297 |
| 4,095,206 | A | * | 6/1978 | Hishiki ......................... 336/96 |
| 4,636,667 | A | | 1/1987 | Holzinger et al. |
| 6,629,358 | B2 | | 10/2003 | Setiabudi et al. |
| 7,432,791 | B2 | | 10/2008 | Hahn et al. |
| 7,911,312 | B2 | | 3/2011 | Hahn et al. |
| 8,061,685 | B2 | * | 11/2011 | Ueda et al. .............. 251/129.15 |
| 8,248,196 | B2 | * | 8/2012 | Bugiel et al. ................. 335/296 |

FOREIGN PATENT DOCUMENTS

| DE | 34 10 119 | 10/1985 |
| DE | 197 03 497 | 8/1997 |
| DE | 10 2004 011 941 | 9/2005 |
| DE | 10 2004 012 743 | 10/2005 |
| WO | 97/30504 | 8/1997 |

* cited by examiner

*Primary Examiner* — Bernard Rojas
(74) *Attorney, Agent, or Firm* — Michael J. Striker

(57) ABSTRACT

A magnet pole for magnetic levitation vehicles includes an iron core (1) having an upper pole surface (2), a lower contact surface (3) for a magnet rear side (4) and a circumferential surface (5) disposed between the pole surface (2) and the contact surface (3). A coil (6) is applied onto the circumferential surface (5) of the iron core (1). An intermediate layer is made of an electrically insulating material, which is disposed between the circumferential surface (5) and the coil (6). A protective layer (9) encapsulates the coil (6). At least the pole surface (2) of the iron core (1) is made of a hard material and abuts the circumferential surface (5) in a lower region of the iron core (1). The protective layer (9) contains a section (15) made of an elastic material in a region adjacent to the circumferential surface (5).

5 Claims, 4 Drawing Sheets

MAGNET POLE FOR MAGNETIC LEVITATION VEHICLES, AND METHOD FOR THE PRODUCTION THEREOF

CROSS-REFERENCE

The invention described and claimed hereinbelow is also described in PCT/EP2010/004636, filed on Jul. 29, 2010 and DE 10 2009 038 559.2, filed on Aug. 28, 2009. This German Patent Application, whose subject matter is incorporated here by reference, provides the basis for a claim of priority of invention under 35 U.S.C. 119 (a)-(d).

BACKGROUND OF THE INVENTION

The invention relates to a magnet pole of the type, and a method for the production thereof.

Magnet poles of the stated type are used in magnetic levitation vehicles and, in this case, in magnet systems of support magnets, for example. They mainly comprise an iron core and a coil in the form of a strip of aluminum or the like, which has been wound onto the circumferential surface of the iron core (e.g. DE 197 03 497 A1, DE 10 2004 011 941 A1). For protection against environmental influences such as moisture, the magnet poles are also encapsulated in a protective layer made of a plastic which comprises an epoxy resin, for example, is relatively hard, wear-resistant and inflexible, and provides protection against corrosion and mechanical stress.

The undersides of the iron cores typically remain free of protective layers. The main reason for this is that the undersides of a plurality of magnet poles of a magnet system are usually interconnected by so-called magnet rear sides for magnetism-related reasons, or other reasons, which are likewise made of iron and are pressed against the undersides of the iron cores using springs or the like (e.g. DE 34 10 119 C2, DE 10 2004 012 743 A1). Due to this measure, the coils are usually wound onto the iron core such that a narrow gap remains between them and the undersides of the iron cores or the upper sides of the magnet rear sides, and the coils therefore always permit the desired close fit of the magnet rear sides against the undersides of the cores despite typical tolerances. The protective layers therefore verge laterally onto the circumferential surfaces of the iron cores in these regions.

During operation of such magnet poles, relatively high currents are conducted through the coils, thereby causing the coils to heat up to a great extent. Due to the different thermal expansion coefficients of iron and the coil material, the result is that the coils expand further in the radial direction than do the iron cores. As a result, there is a risk that the elongation at tear of the protective layers which are typically used and which are fixedly connected to the coils will be greatly exceeded at critical points. In this context, the points at which the protective layers verge laterally on the circumferential surfaces of the iron cores have proven critical above all.

The protective layers are subject to particularly strong mechanical stresses in the critical regions when the electromagnets equipped with the magnet poles are switched on and off in cycles, as is the case, for example, with support magnets of a magnetic levitation vehicle due to the constant switch between vehicle operation and pauses in vehicle operation. As a result, cracks forms in the protective layers and/or gaps between the circumferential surfaces of the iron cores and the end faces of the protective layers adjacent thereto, thereby permitting moisture to enter the interior of the magnet poles and, over time, destroy the insulation between the coils and the iron cores. Leakage currents induced as a result render the magnet poles unusable if they reach a certain size.

SUMMARY OF THE INVENTION

Proceeding therefrom, the technical problem addressed by the present invention is that of designing the magnet pole of the type in question such that tearing of the protective layer in the critical regions is reduced, thereby markedly increasing the service life of the magnet pole. In addition, a method for the production of the magnet pole is provided.

A marked improvement of the environmental resistance of the magnet poles, with regard to moisture in particular, is achieved by way of the invention. Obviously, the elastic section of the protective layer, which is provided in the critical regions, can compensate for the different thermal expansions resulting from the different expansion coefficients and thereby prevent the gaps and tears described above.

BRIEF DESCRIPTION OF THE DRAWINGS

The present invention is explained below in greater detail with reference to the attached drawings of an embodiment. They show.

DETAILED DESCRIPTION OF THE PREFERRED EMBODIMENTS

Figure 1:
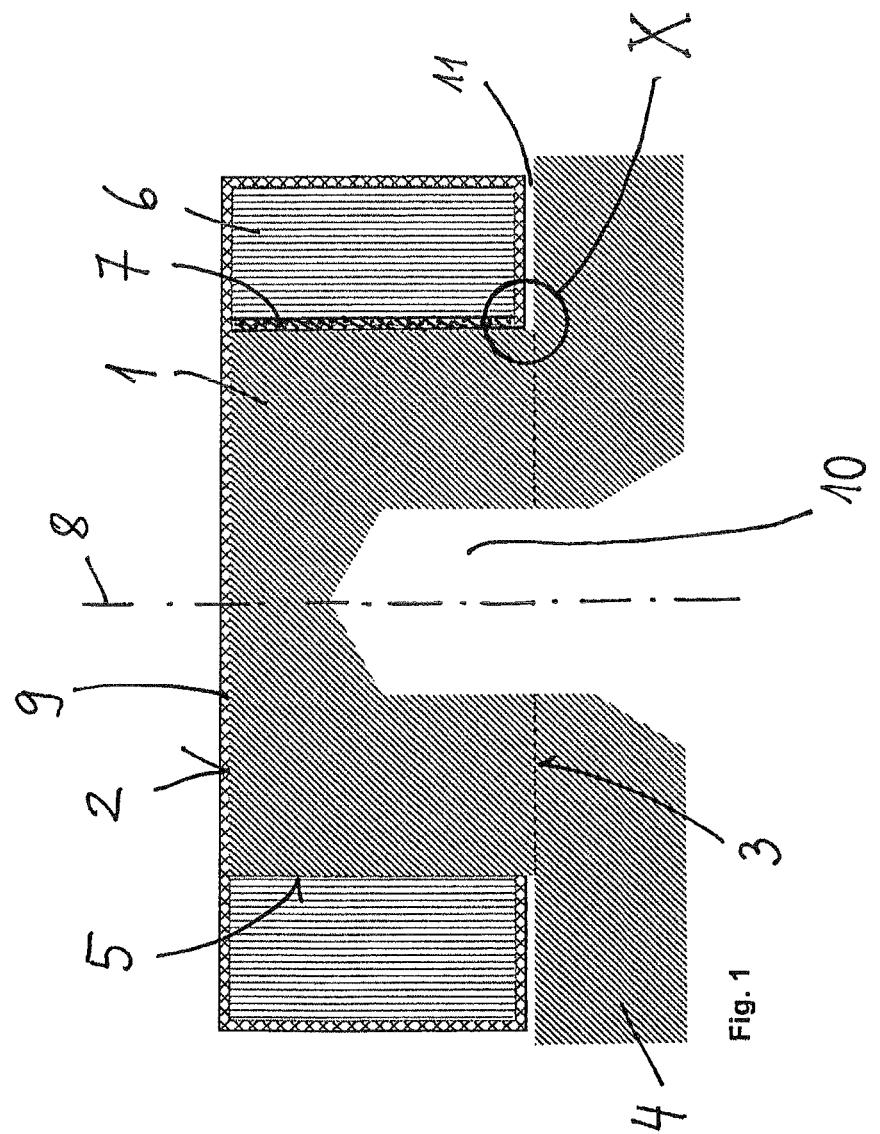
FIG. 1 a section through a known magnet pole for magnetic levitation vehicles.

FIG. 1 shows a known magnet pole which is used, for example, in a magnet system for a support magnet in a magnetic levitation vehicle. It contains a ferromagnetic iron core 1 composed of electrical steel sheets, which is equipped with a pole surface 2 on an upper side, a contact surface 3 for a magnet rear side 4 on a lower side, and, on the circumference thereof, with a circumferential surface 5 disposed between the upper pole surface 2 and the lower contact surface 3. A coil 6 in the form of a disk is wound onto the circumferential surface 5, which comprises, for example, a conductive strip which is made of aluminum or another advantageous, highly electrically conductive material and is applied in a plurality of layers. An intermediate layer 7 made of insulating material, e.g. a suitable plastic, which is depicted in FIG. 1 only in the right-hand part but which actually encloses the iron core 1, is disposed between the iron core 1 and the coil 6, and serves, in particular, to electrically insulate the coil 6 with respect to the iron core 1 in the radial direction relative to a central axis 8 of the magnet pole.

According to FIG. 1, the magnet pole is encapsulated by a protective layer 9 all around, except on the contact surface 3 which is preferably made of a casting resin, e.g. an epoxy resin, and serves in particular to protect against corrosion, while also providing mechanical protection. Preferably this protective layer 9 is applied by gelling under pressure, for example.

The lower contact surface 3 of the iron core 1 preferably remains free of the protective layer 9 because it is intended for placement against the magnet rear sides 4 which are likewise made of ferromagnetic material, which serve to interconnect a plurality of magnet poles in a magnet system. In addition, the iron core 1 is provided with a recess 10 on the underside thereof to reduce weight since no iron is required here, for magnetism-related reasons. The walls of the iron core 1 bordering the recess 10 likewise remain free of the protective layer 9. For the rest, the magnet rear side 4 is pressed against the contact surface 3, e.g. using springs which are not depicted.

Magnet poles of the type described are known in general from the initially mentioned documents, which are hereby made the subject matter of the present disclosure by reference thereto, to prevent repetition.

Figure 2:
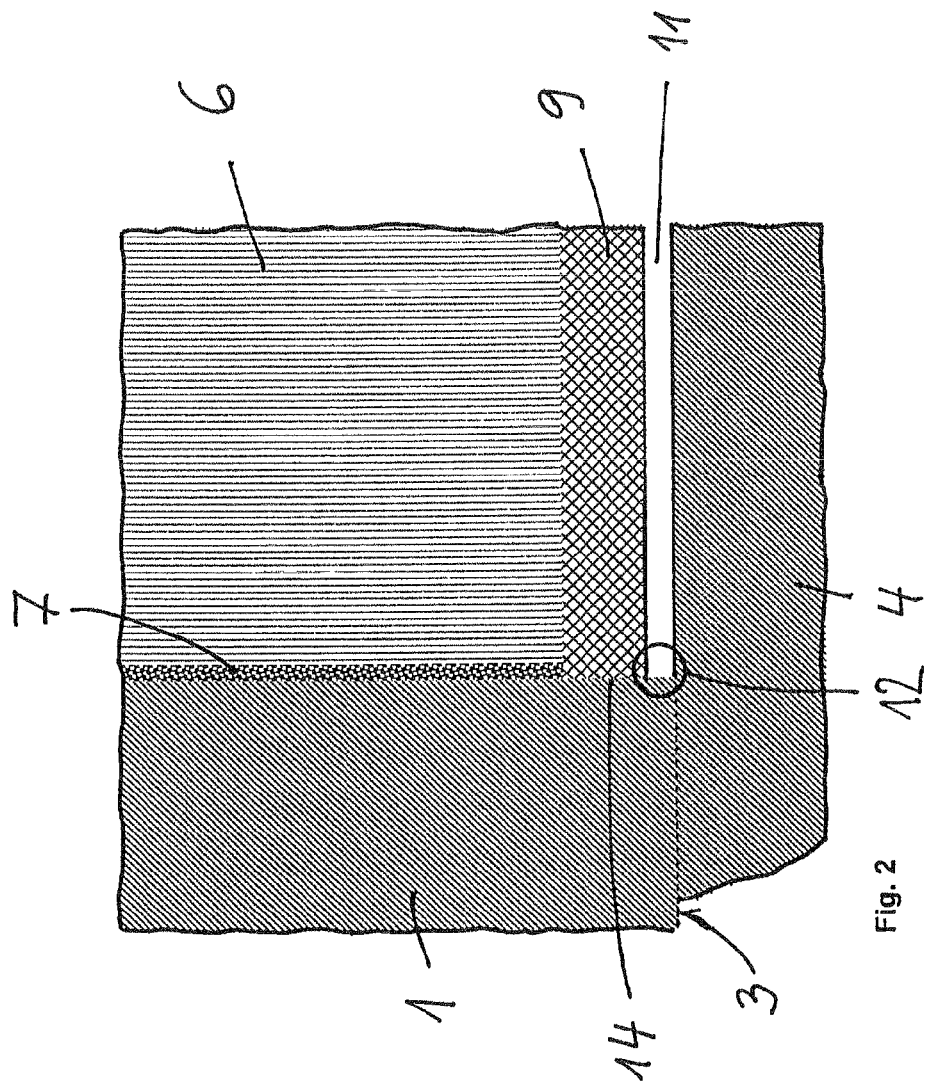
FIG. 2 a greatly enlarged detail X of the magnet pole according to FIG. 1, in the region of a point that is critical with regard to the development of insulation damage.

As shown in FIG. 2 in particular, the underside of the coil 6 is separated slightly from the contact surface 3 or an upper side of the magnet rear side 4 facing it. A gap 11 formed as a result having a height of a few millimeters at most serves to prevent the coil 6 from resting on the magnet rear side 4 and, even when relatively great tolerances are permitted, to ensure that the magnet rear side 4 comes to rest tightly against the contact surface 3.

Due to the arrangement described, a region of the magnet pole indicated in FIG. 2 using a circle 12 is particularly critical. If the coil 6, when heated, expands radially relative to the central axis 8 (FIG. 1) to a greater extent due to the greater thermal expansion coefficient thereof than the iron core 1, then the protective layer 9 adhering to the coil 6 can tear in the region of a point of contact 14 where it abuts the circumferential surface 5 of the iron core 1, or in the vicinity thereof, thereby forming open gaps and/or cracks form by way of which moisture can enter the intermediate layer 7 and gradually destroy it. This applies that much more since the protective layer 9 is made of a relatively hard material due to the function thereof which also includes mechanical protection, which tears when the yield point is reached. Another possible type of fault is that the protective layer 9 will simply detach from the circumferential surface 5 in the region of the point of contact 14, i.e. loses contact therewith, thereby forming a gap.

Figure 3:
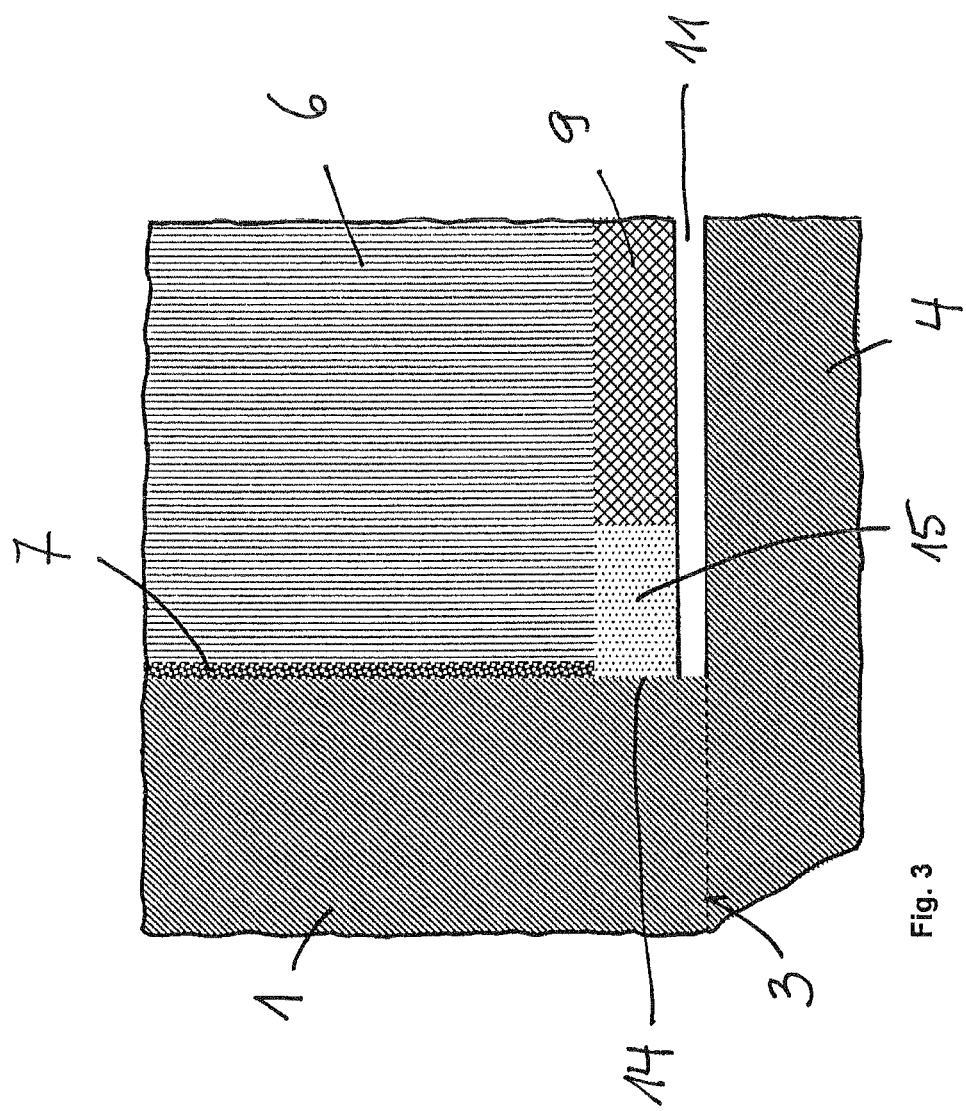
FIG. 3 a detail of a magnet pole, which corresponds to FIG. 2.

The problems described are largely prevented according to the invention in that the protective layer 9 according to FIG. 3 is provided with a section 15, which is made of an elastic material, in a region directly adjacent to the circumferential surface 5. In other words, the previous encapsulation of the magnet pole with a layer that is composed continuously of the same material is replaced by a covering made of a plurality of materials. In this manner, the individual layers or components of the encapsulation or the protective layer 9 can be optimized in accordance with the local thermal or mechanical stresses or other types of stresses, which result due to the particular environmental conditions, for example. In particular, the plastic which was previously common is replaced by an elastic material in the section 15, which is suitable for absorbing the mechanical stresses resulting from the deformations, and also acts as a barrier with respect to moisture, and is temperature-resistant and insoluble in water.

According to an embodiment which is currently considered to be the best, the section 15 is made of a silicone. This material is preferably applied in that, while the magnet pole is being covered with the remaining part of the protective layer 9, a gap which encloses the iron core 1 in an annular manner is kept free in the region where the section 15 is intended to rest, and the silicone, which has been brought to a liquid or pasty state, is cast or injected into this gap or open space at a later point in time. Tests have shown that the elastic section 15 adheres to the iron core 1 even in the case of high thermal load on the point of contact 14 with the circumferential surface 5 and the seal is therefore retained at this point. A further particular advantage is that the seal provided by way of the section 15 is also retained if the intermediate layer 7 should become damaged due to the different thermal expansions described. From a mechanical perspective, great stresses are not placed on the section 15 since it does not rest on an outer surface of the magnet pole. In all, the invention therefore results in a marked increase in the service life of the magnet pole.

The material which is available on the market under the name "Terostat-33 transparent F" has proven particularly suitable for the stated purpose.

Figure 4:
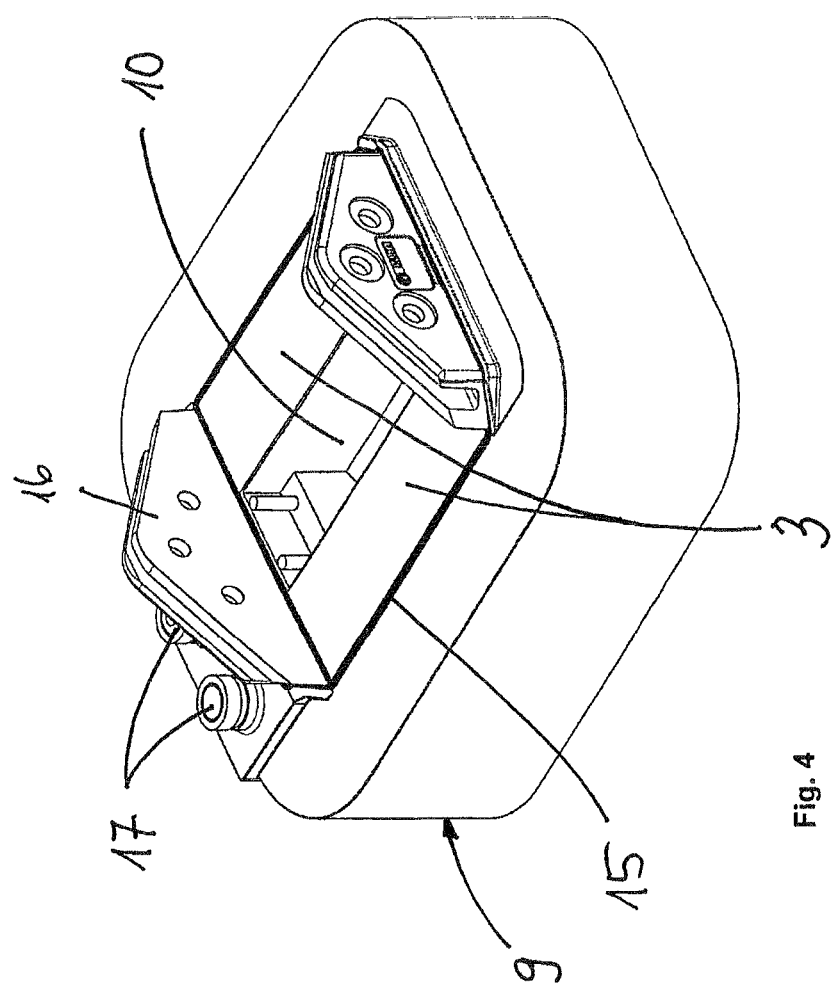
FIG. 4 a perspective underside view of a complete magnet pole according to the invention.

FIG. 4 shows a perspective depiction of the magnet pole without a magnet rear side, which extends upwardly by way of the underside thereof. A bold line is used to indicate the section 15 which is disposed between the iron core 1, of which only the contact surface 3 is visible, and the remaining part of the protective layer 9. In addition, two pole cheeks 16, which are intended for fastening the magnet pole in a magnet system, and connectors 17 for the coil 6, which is not shown here, are indicated.

The present invention is not limited to the embodiments described, which could be modified in various manners. This applies, in particular, for the materials used in the specific case for the layers 9 and 15, which are selected depending on the specific case and can be adapted to the particular conditions. In addition, the material and the dimensions, in particular the radial length of the section 15, can be selected depending on the thermal stress that occurs and the dimensioning of the magnet pole such that the above-described cracks or detachments in the region of the point of contact 14 can be reliably prevented. Finally, it is understood that the features described may also be used in combinations other than those described and depicted herein.

What is claimed is:

1. A magnet pole for magnetic levitation vehicles, containing:
    an iron core (1) having an upper pole surface (2), a lower contact surface (3) for a magnet rear side (4) and a circumferential surface (5) disposed between the pole surface (2) and the contact surface (3), and a coil (6) applied onto the circumferential surface (5) of the iron core (1), an intermediate layer (7) made of an electrically insulating material, which is disposed between the circumferential surface (5) and the coil (6), and a protective layer (9) which encapsulates the coil (6) and at least the pole surface (2) of the iron core (1), is made of a hard material, and abuts the circumferential surface (5) in a lower region of the iron core (1), wherein the protective layer (9) contains a section (15) made of an elastic material in a region adjacent to the circumferential surface (5).

2. The magnet pole according to claim 1, wherein the section (15) and the remaining part of the protective layer (9) are made of materials selected in accordance with the local thermal and/or mechanical stresses.

3. The magnet pole according to claim 1, wherein the section (15) is made of a permanently elastic silicone.

4. A method for the production of the magnet pole according to one of the claims 1 to 3, wherein, during encapsulation of the iron core (1) and the coil (6) with the protective layer (9), a gap (11) which surrounds the iron core (1) in an annular manner is left open in a protective layer (9), between the circumferential surface (5) of the iron core (1) and the protective layer (9) which is to be applied and is made of a hard material, and is filled with the elastic material in a subsequent method step.

5. The method according to claim 4, wherein the elastic material is injected or cast in liquid or paste form into the gap (11) which was left open.

\* \* \* \* \*